(12) United States Patent
Chang et al.

(10) Patent No.: US 11,697,993 B1
(45) Date of Patent: Jul. 11, 2023

(54) ROTARY ENGINE

(71) Applicants: Shih-Ho Chang, Changhua (TW);
Han-Chih Chang, Shanghua (TW);
Hsin-Yu Chang, Changhua (TW)

(72) Inventors: Shih-Ho Chang, Changhua (TW);
Han-Chih Chang, Changhua (TW)

(73) Assignees: Shih-Ho Chang, Changhua (TW);
Han-Chih Chang, Changhua (TW);
Hsin-Yu Chang, Changhua (TW)

( * ) Notice: Subject to any disclaimer, the term of this patent is extended or adjusted under 35 U.S.C. 154(b) by 0 days.

(21) Appl. No.: 18/089,992

(22) Filed: Dec. 28, 2022

(51) Int. Cl.
*F01B 13/06* (2006.01)
*F02B 57/08* (2006.01)
*F02B 75/22* (2006.01)

(52) U.S. Cl.
CPC ........... *F01B 13/068* (2013.01); *F02B 57/08* (2013.01)

(58) Field of Classification Search
CPC ........ F01B 13/068; F02B 57/08; F02B 75/22; F02B 75/222; F04B 27/053; F04B 27/04; F04B 27/0404; F04B 27/06; F04B 27/065
See application file for complete search history.

(56) References Cited

U.S. PATENT DOCUMENTS

| | | | | |
|---|---|---|---|---|
| 2,018,306 A | * | 10/1935 | Hunt | F02B 57/08 123/226 |
| 5,954,017 A | * | 9/1999 | Federowicz | F01B 13/068 123/44 R |
| 2017/0254320 A1 | * | 9/2017 | Schulze | F04B 27/0409 |

* cited by examiner

*Primary Examiner* — Deming Wan
(74) *Attorney, Agent, or Firm* — Muncy, Geissler, Olds & Lowe, P C.

(57) ABSTRACT

A rotary engine is provided, including: a stator assembly, including an intake stator including an annular intake groove and an exhaust stator including an annular exhaust groove which define a track therebetween; a rotor, rotatably disposed between the intake and exhaust stators, including cylinders each being covered by one of the cylinder head and cylinder heads each including an intake port and an exhaust port, the intake and exhaust ports being connected to the annular intake and exhaust grooves, respectively; a shaft, inserted axially in the stator assembly and the rotor; valve mechanisms, posited on the cylinder heads respectively and each including an intake valve and an exhaust valve; pistons, received in the cylinders respectively and each including a piston rod which is movable along the track; and spark plugs, posited on the cylinder heads and exposed to interiors of the cylinders, respectively.

16 Claims, 15 Drawing Sheets

US 11,697,993 B1

ROTARY ENGINE

BACKGROUND OF THE INVENTION

Field of the Invention

The present invention relates to a rotary engine.

Description of the Prior Art

Nowadays, the engine plays an important role in the power demands of vehicles or other fields. Generally, the conventional engine performs intake, compression, power and exhaust strokes through the cooperation of the cylinder, piston, crankshaft, valve, to achieve a complete power cycle.

However, the manufacture and assembly of the structure and components of the conventional engine are very complicated and difficult. For example, the crankshaft needs to be designed as a curved shaft according to the number of pistons. Therefore, the piston moves up and down eccentrically, and thus there is great friction between the piston and the cylinder. As a result, the cylinder and piston are easy to wear and damage, and the crankshaft is easy to break. Moreover, at a power starting point when the power stroke starts, the piston rod and the crankshaft of the conventional engine are aligned with each other, so the power generated by the explosion is not efficiently transmitted so that the power cannot be fully output. In addition, the number of cylinders of the conventional engine is also greatly limited, so it cannot provide a large power output. In the present invention, a large shaft larger than the crankshaft of the conventional engine can be used in a rotary engine so that the rotary engine runs more smoothly and outputs greater power and so that an air supply hole can be formed in the large shaft, which allows the cooling air outside the rotary engine to enter the cylinder to cool the rotary engine effectively and quickly.

The present invention is, therefore, arisen to obviate or at least mitigate the above-mentioned disadvantages.

SUMMARY OF THE INVENTION

The main object of the present invention is to provide a rotary engine which can carry out multiple power strokes during one rotation and provide greater power output.

To achieve the above and other objects, a rotary engine is provided, including: a stator assembly, including an intake stator and an exhaust stator, the intake stator and the exhaust stator each including an annular guiding groove, the annular guiding groove of the intake stator and the annular guiding groove of the exhaust stator axially corresponding to each other and defining a track, the intake stator further including an annular intake groove, the exhaust stator further including an annular exhaust groove; a rotor, rotatably disposed between the intake stator and the exhaust stator, including a plurality of cylinders and a plurality of cylinder heads, each of the plurality of cylinders being covered by one of the plurality of cylinder heads, each of the plurality of cylinder heads including an intake port and an exhaust port, the intake port being connected to the annular intake groove, the exhaust port being connected to the annular exhaust groove; a shaft, inserted axially in the stator assembly and the rotor; a plurality of valve mechanisms, posited on the plurality of cylinder heads respectively and each including an intake valve configured to selectively close the intake port and an exhaust valve configured to selectively close the exhaust port; a plurality of pistons, received in the plurality of cylinders respectively and each including a piston rod which projects radially beyond one of the plurality of cylinders and is movable along the track, an intake starting point, a compression starting point, a power starting point and an exhaust starting point of each of the plurality of pistons being defined sequentially relatively based on the track; and a plurality of spark plugs, posited on the plurality of cylinder heads and exposed to interiors of the plurality of cylinders, respectively.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
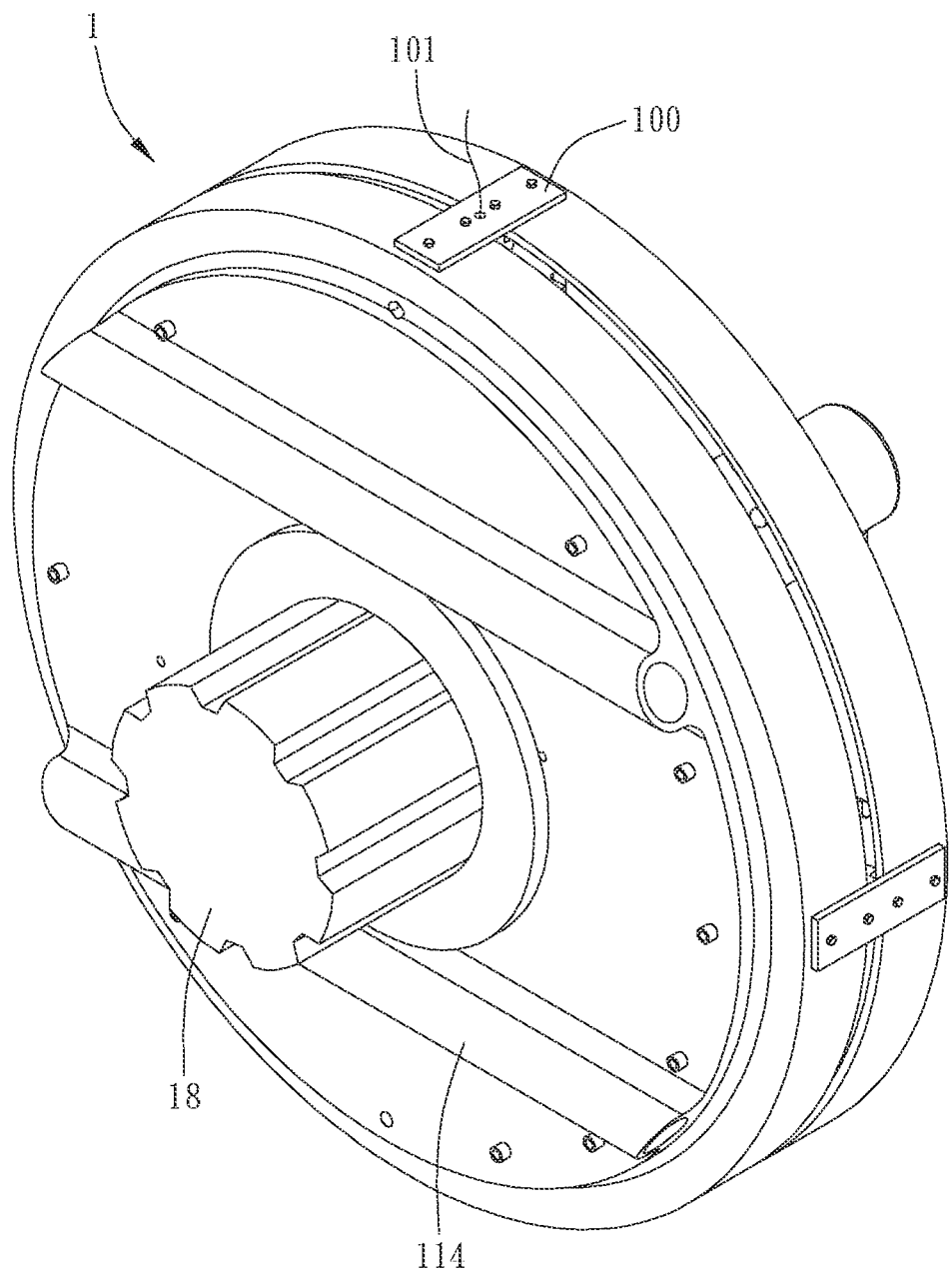
FIG. 1 is a stereogram of a preferable embodiment of the present invention.
Figure 2:
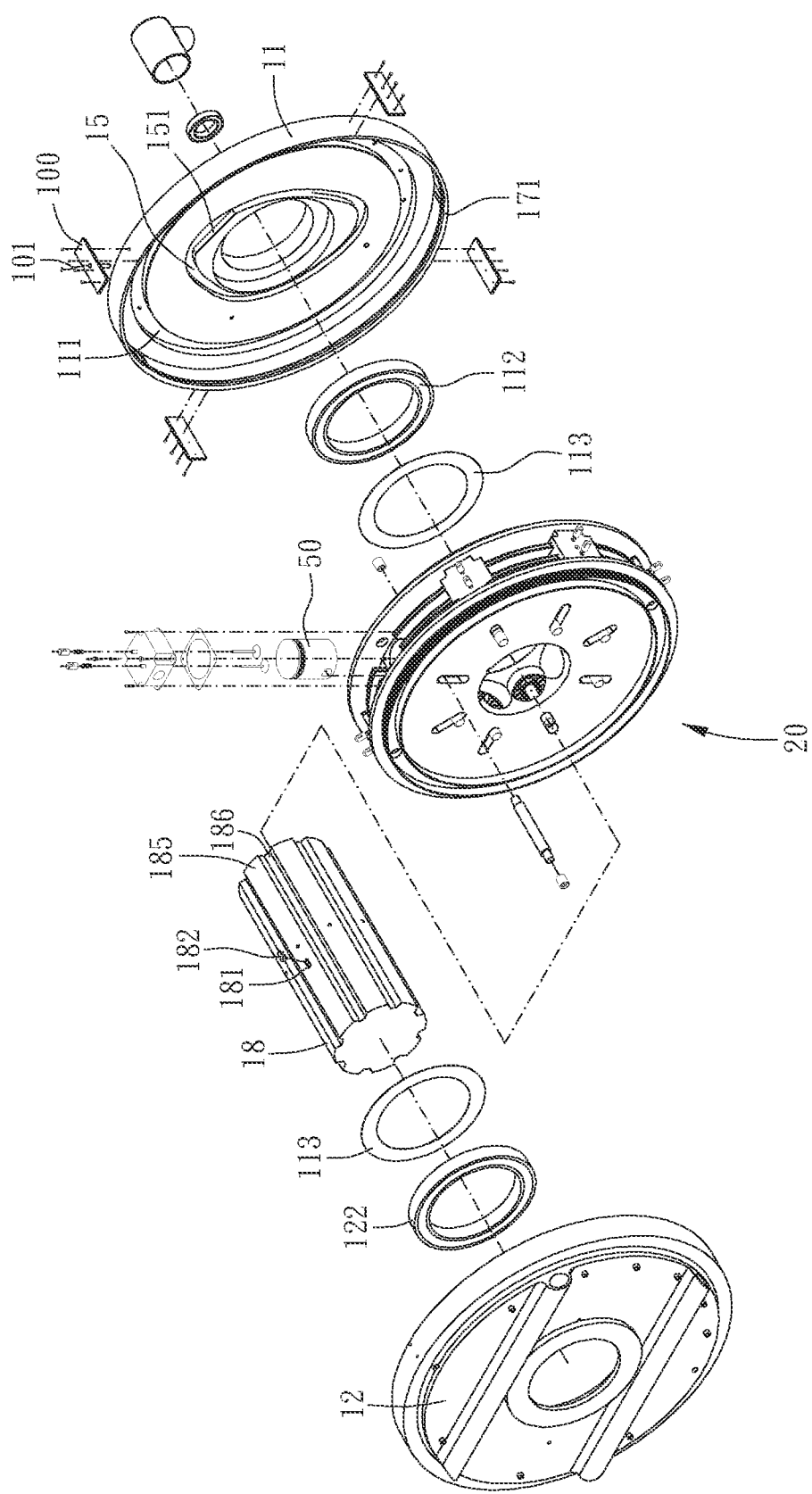
FIG. 2 is a breakdown drawing of a preferable embodiment of the present invention.
Figure 3:
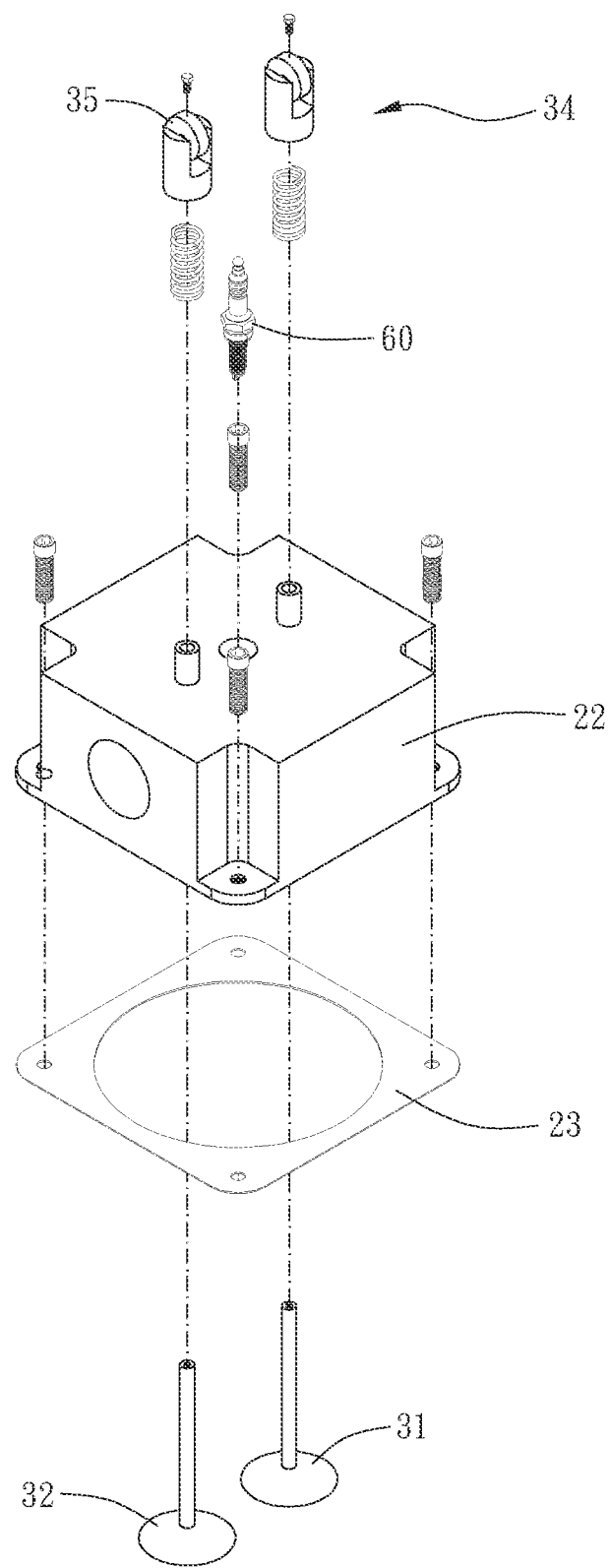
FIG. 3 is a partial breakdown drawing of a preferable embodiment of the present invention.

Please refer to FIGS. 1 to 14 for a preferable embodiment of the present invention. A rotary engine 1 of the present invention includes a stator assembly 10, a rotor 20, a plurality of valve mechanisms 30, a plurality of pistons 50 and a plurality of spark plugs 60.

Figure 4:
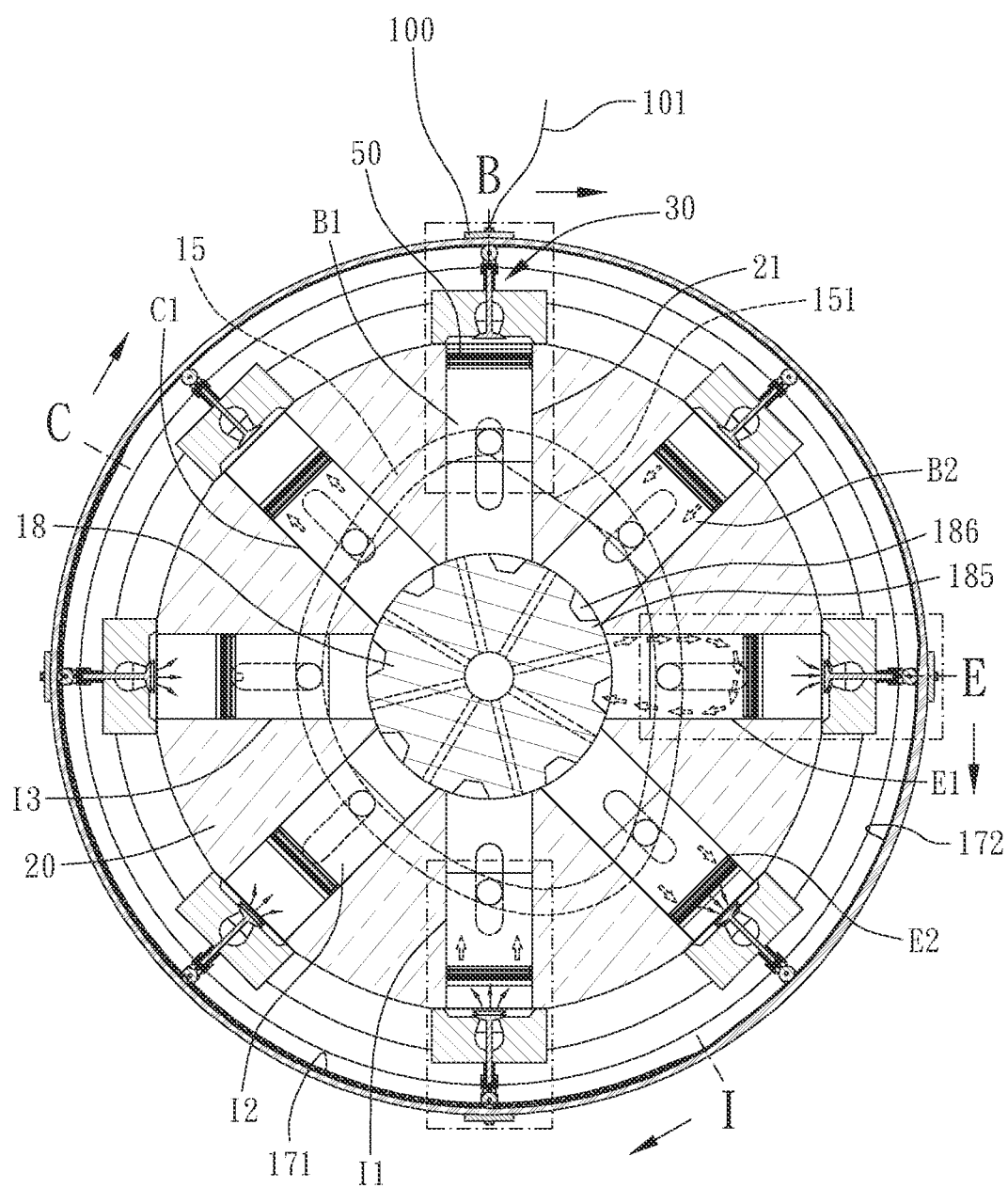
FIG. 4 is a drawing showing operation of a rotary engine of a preferable embodiment of the present invention.
Figure 5:
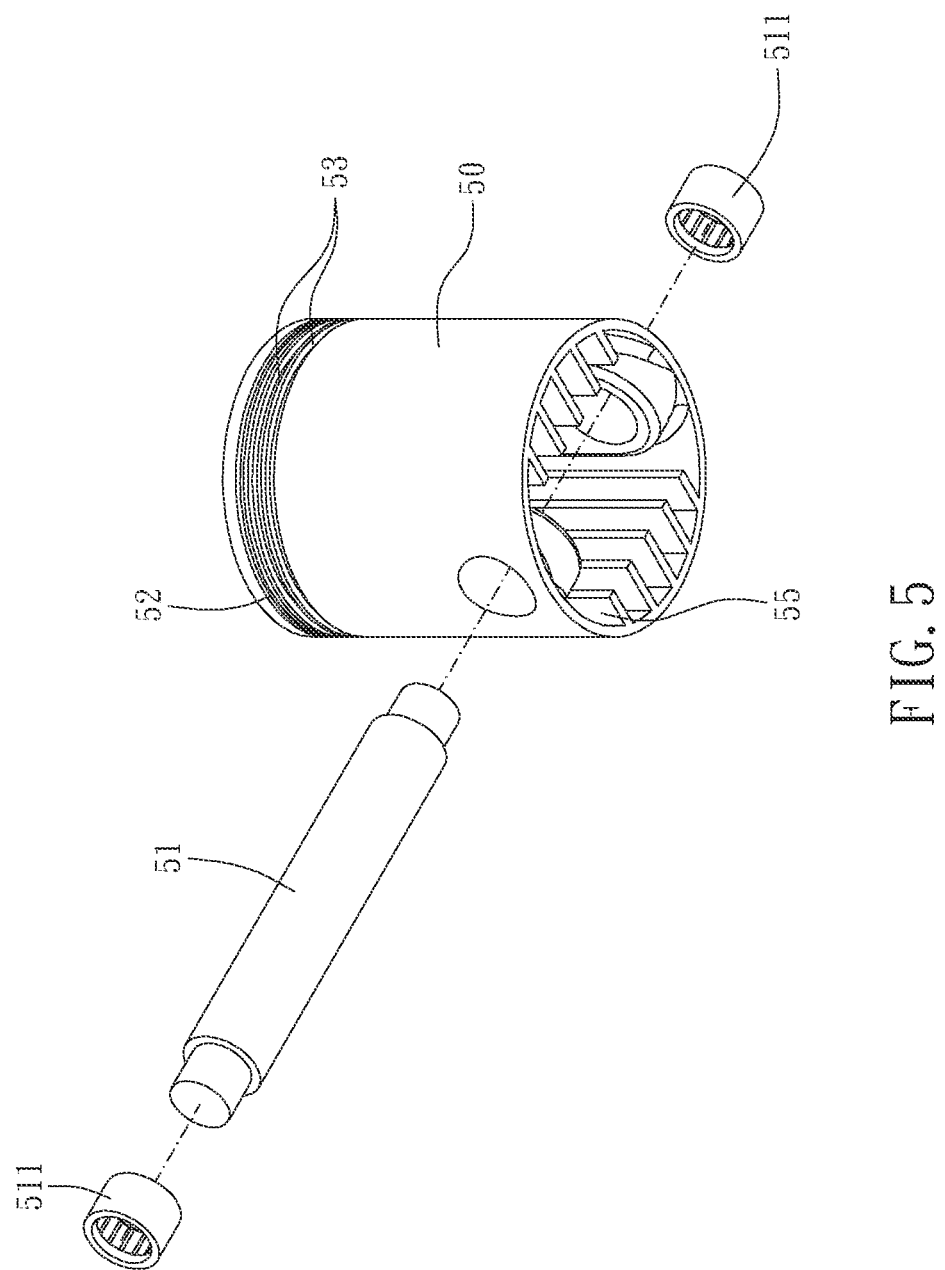
FIG. 5 is a drawing showing a piston of a preferable embodiment of the present invention.
Figure 6:
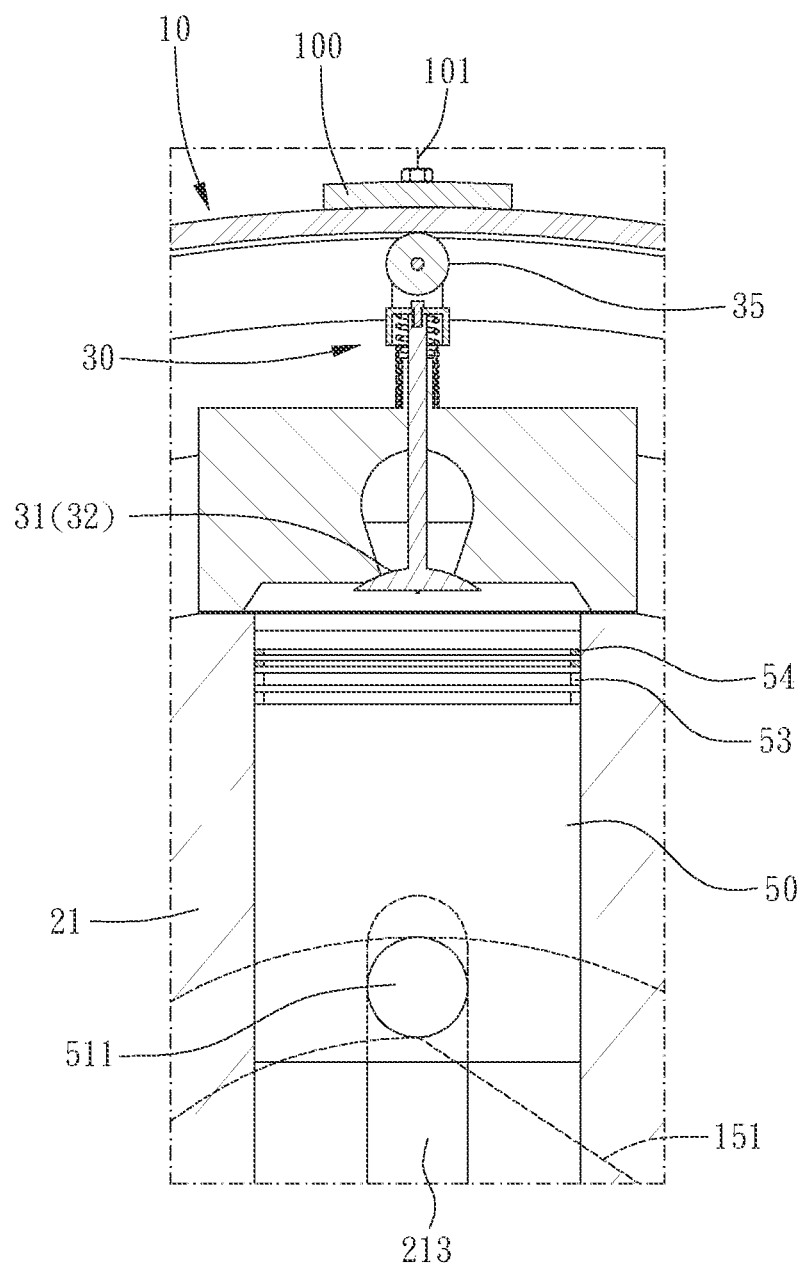
FIGS. 6-8 are schematic diagrams of FIG. 4.
Figure 7:
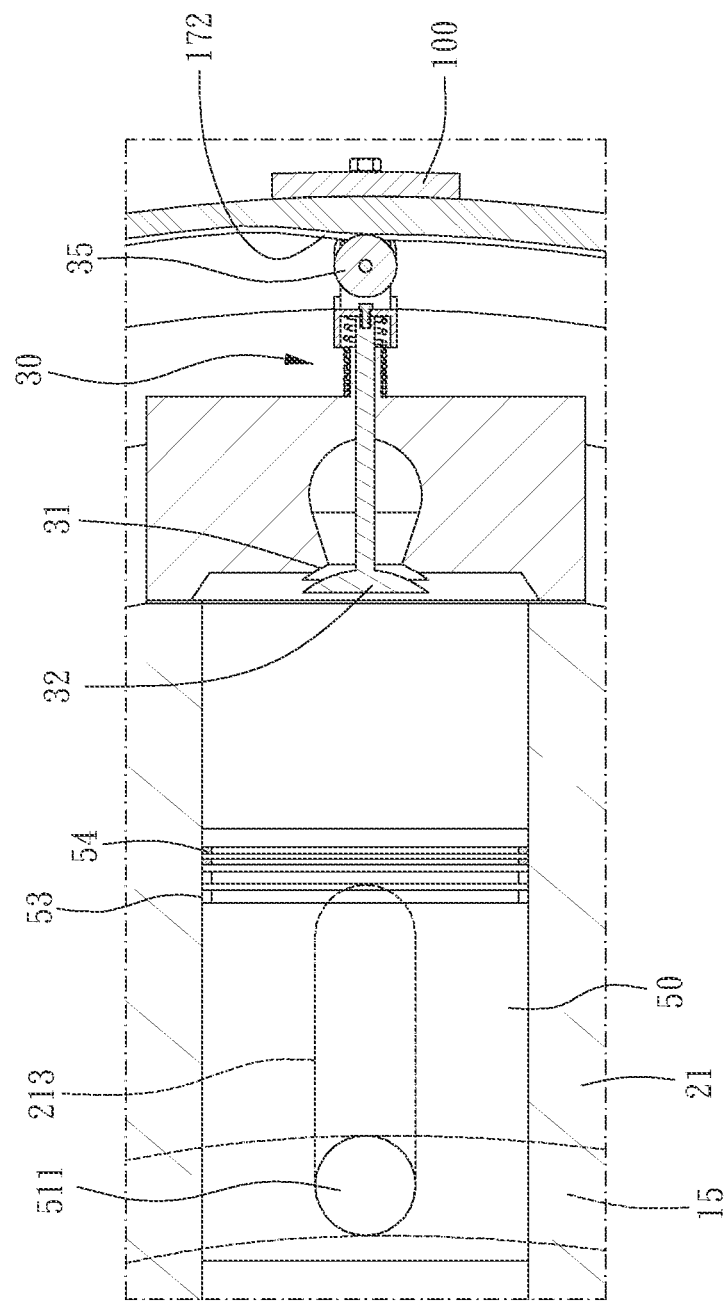
Figure 8:
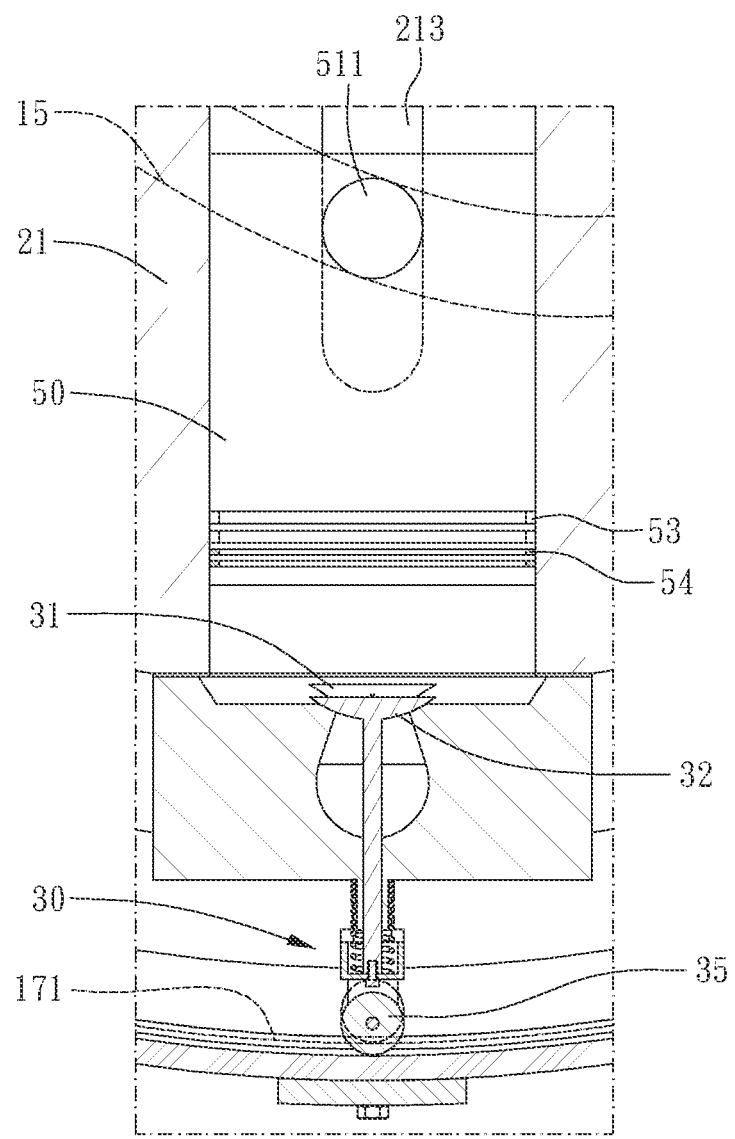
Figure 9:
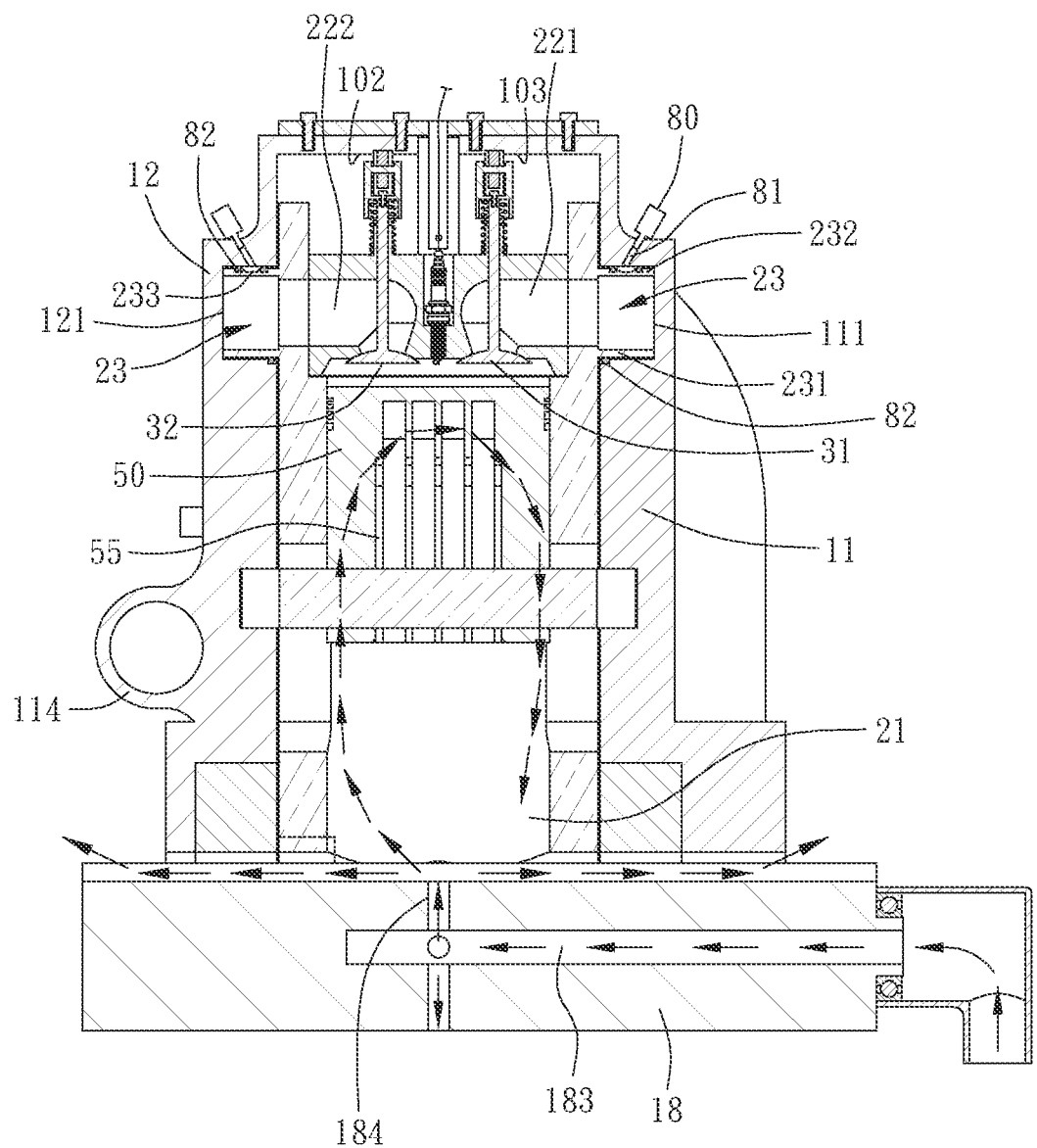
FIG. 9 is a partial cross-sectional view of a preferable embodiment of the present invention.
Figure 10:
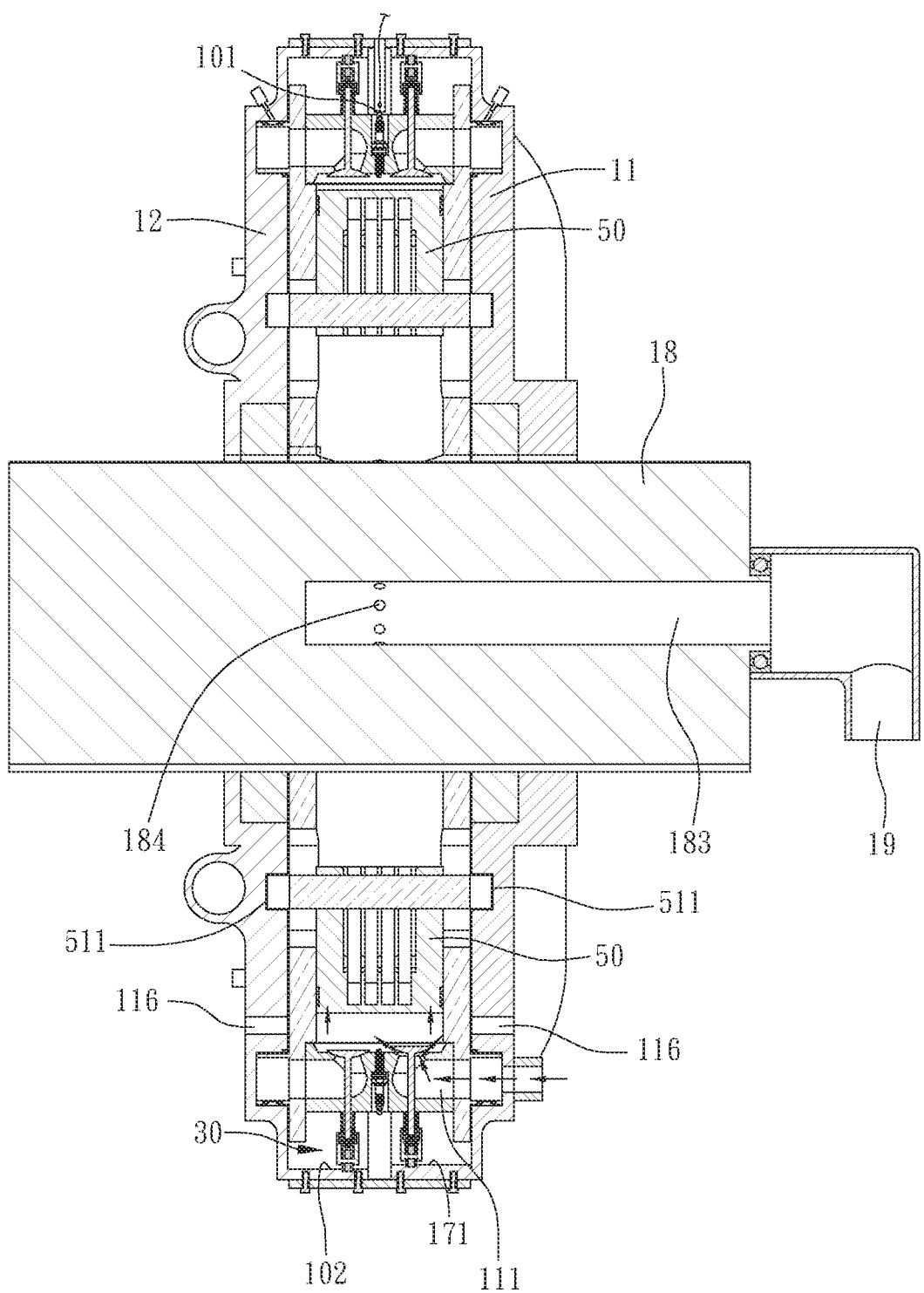
FIG. 10 is a cross-sectional view taken radially according to a preferable embodiment of the present invention.
Figure 11:
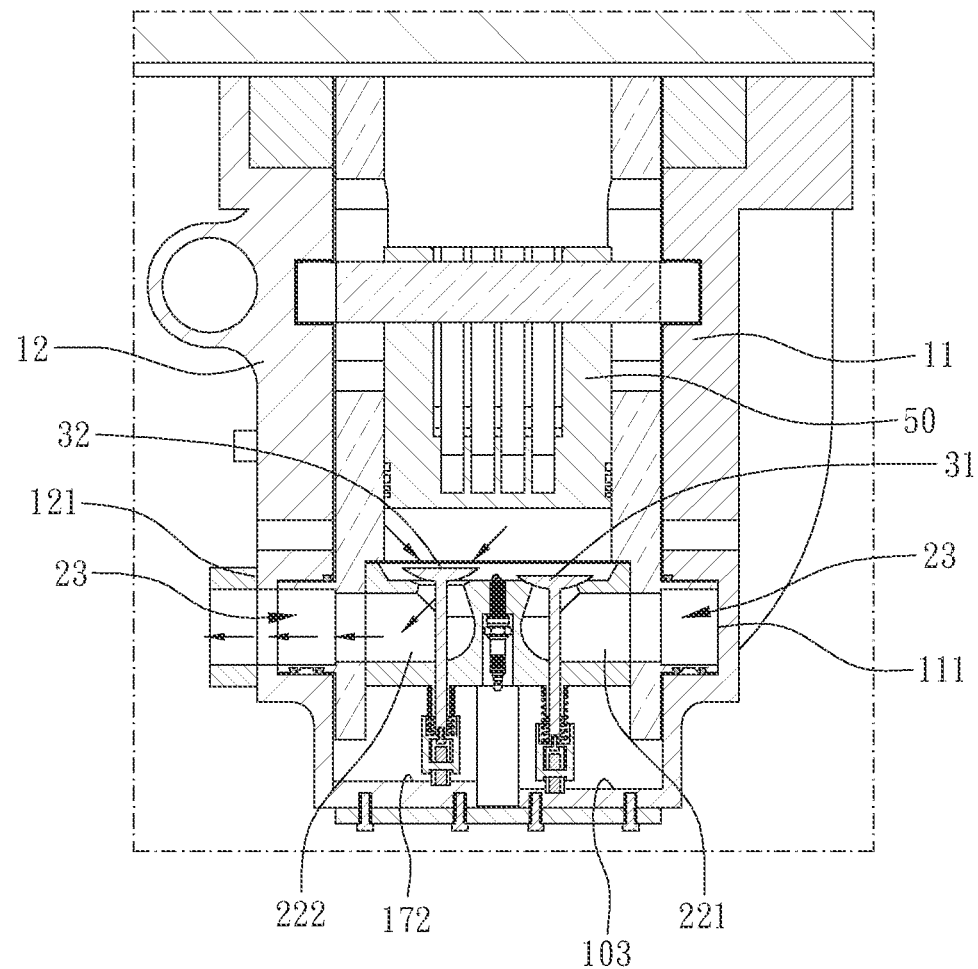
FIG. 11 is a schematic diagram of FIG. 10.
Figure 12:
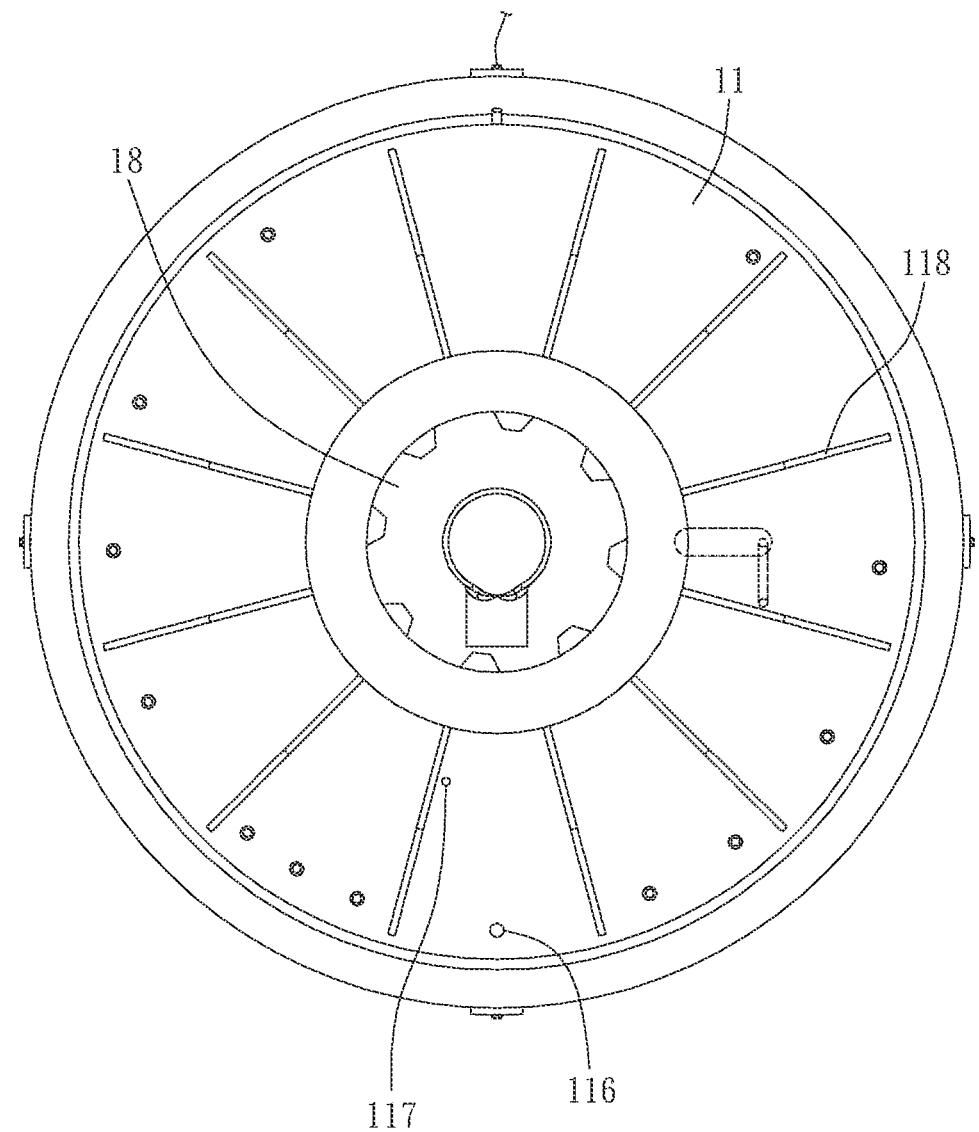
FIG. 12 is a first side view of a preferable embodiment of the present invention.
Figure 13:
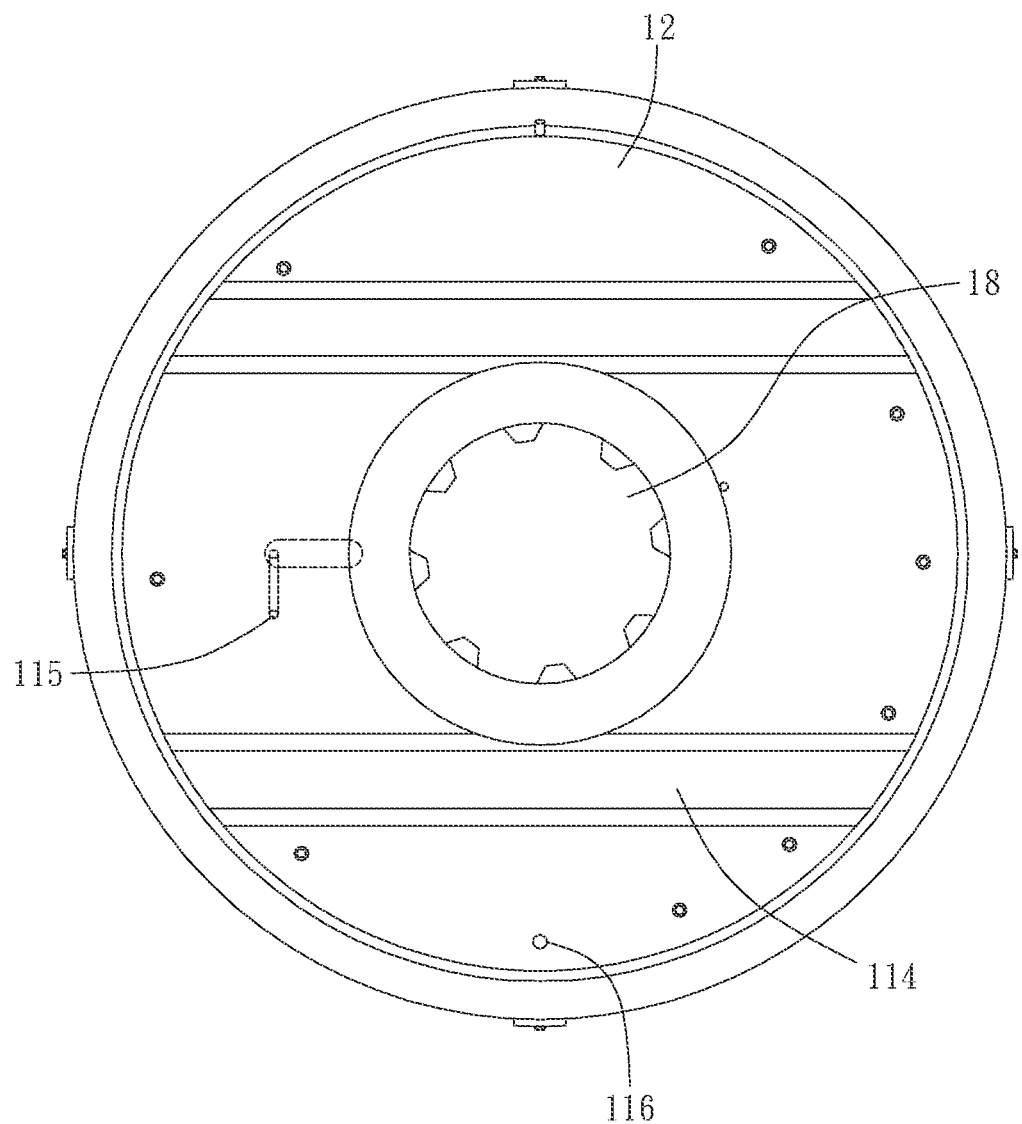
FIG. 13 is a second side view of a preferable embodiment of the present invention.
Figure 14:
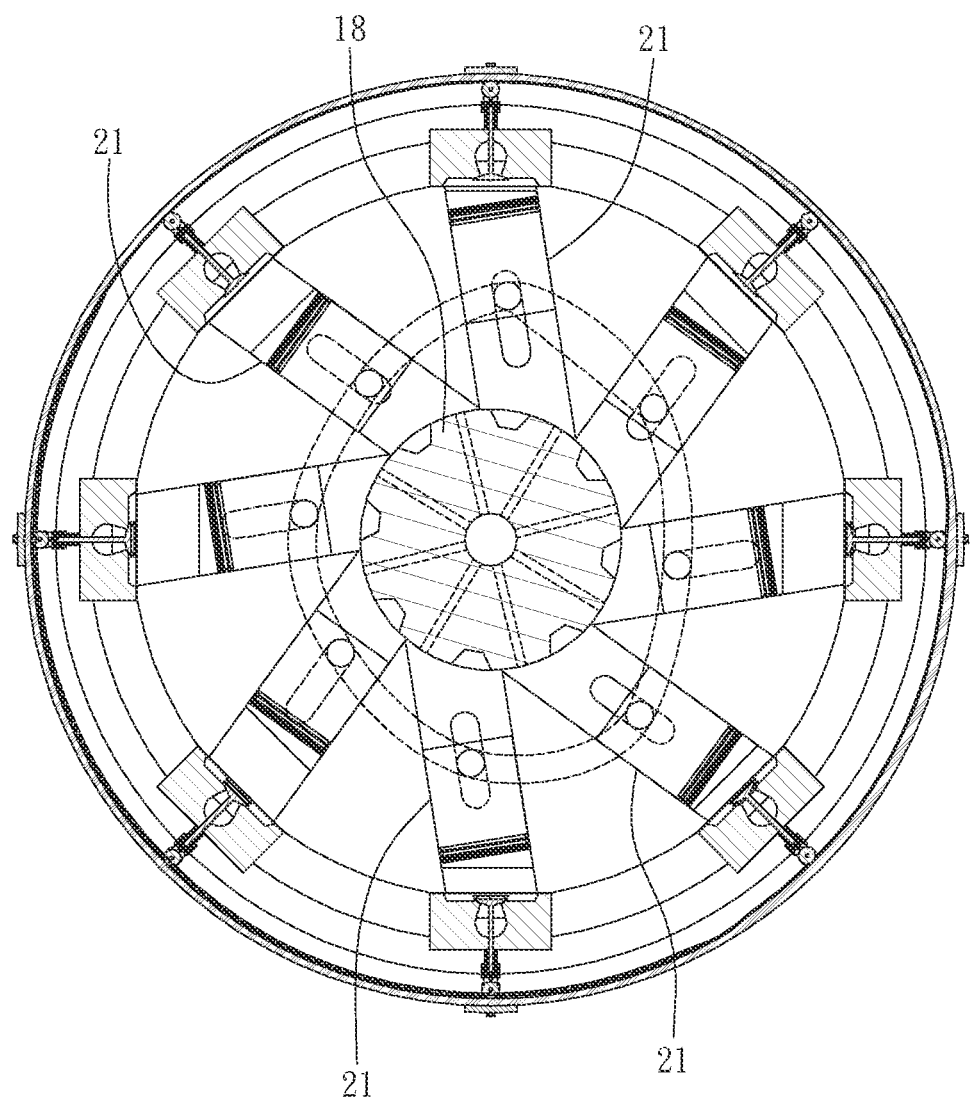
FIG. 14 is a cross-sectional view taken radially according to another preferable embodiment of the present invention.

The stator assembly 10 includes an intake stator 11 and an exhaust stator 12. The intake stator 11 and the exhaust stator 12 each include an annular guiding groove 13, and the annular guiding groove 13 of the intake stator 11 and the annular guiding groove 13 of the exhaust stator 12 axially correspond to each other and define a track 15. The intake stator 11 further includes an annular intake groove 111, and the exhaust stator 12 further includes an annular exhaust groove 121. The rotor 20 is rotatably disposed between the intake stator 11 and the exhaust stator 12, and the rotor 20 includes a plurality of cylinders 21 and a plurality of cylinder heads 22. Each of the plurality of cylinders 21 is covered by one of the plurality of cylinder heads 22, and a cylinder gasket 23 is disposed between the cylinder head 22 and cylinder 21. Each of the plurality of cylinder heads 22 includes an intake port 221 and an exhaust port 222, the intake port 221 is connected to the annular intake groove 111, and the exhaust port 222 is connected to the annular exhaust groove 121. The plurality of valve mechanisms 30 are posited on the plurality of cylinder heads 22 respectively and each include an intake valve 31 configured to selectively close the intake port 221 and an exhaust valve 32 configured to selectively close the exhaust port 222. The plurality of pistons 50 are received in the plurality of cylinders 21 respectively and each include a piston rod 51 which projects radially beyond one of the plurality of cylinders 21 and is movable along the track 15. An intake starting point I, a compression starting point C, a power starting point B and an exhaust starting point E of each of the plurality of pistons 50 are sequentially defined relatively based on the track 15 (FIG. 4). The plurality of spark plugs 60 are posited on the plurality of cylinder heads 22 and exposed to interiors of the plurality of cylinders 21, respectively, for ignition at the power starting point B. The stator assembly 10 is fixedly connected to a fixation frame 100, and the fixation frame 100 includes a terminal 101. When each of the plurality of spark plugs 60 moves with the cylinder head 22 to correspondingly contact the terminal, it ignites. Whereby, there are multiple power strokes during one rotation of the rotor 20, which can provide greater power output.

Preferably, the track 15 includes an inclined section 151 in a location on its inner side corresponding to the power starting point B. The inclined section 151 allows the bearing 511 of the piston rod 51 to slide downward along the inclined section 151 smoothly at the power starting point B so that the explosion power can be maximally converted to the piston 50 to generate huge torque without decreasing the power conversion efficiency.

The rotor 20 further includes two annular chambers 23 (FIG. 9), and each of the two annular chambers 23 is defined by an inner annular wall 231 and an outer annular wall 232 inserted in the annular intake groove 111 and the annular exhaust groove 121, respectively. The outer annular wall 232 includes an annular reservoir 233 on an outer side thereof, the stator assembly 10 further includes a plurality of oiling holes 81 connected to at least one oil pot 80, and each of the plurality of oiling holes 81 is connected to the annular reservoir 233. Two seals 82 are engaged within the outer annular wall at two sides of the annular reservoir 233 and abutted against an inner surface of the annular guiding groove 13, so that the oil can be retained in the annular reservoir 233 and the two seals 82 help air sealing. The consumption of oil between the two seals 82 is little so that the oil pot 80 is sufficient to supply the oil required and to ensure formation of the sealing chamber. There are oiling holes 115 between the rotor 20 and the intake stator 11 and between the rotor 20 and the exhaust stator 12, which allows the oil to lubricate the piston 50 and the two seals 82 and enhances cooling of the rotary engine.

Specification, a shaft 18 is inserted axially in the stator assembly 10 and the rotor 20, and the shaft 18 and the rotor 20 include a key slot 181, respectively. A key 182 is keyed in the key slots of the shaft 18 and the rotor 20 so that the rotor 20 rotates in lock steps with the shaft 18.

In an alternative embodiment (FIG. 14), the cylinders 21 are eccentrically arranged relative to the shaft 18.

A first bearing 112 is sleeved with and between the intake stator 11 and the shaft 18, and a second bearing 122 is sleeved with and between the exhaust stator 12 and the shaft 18. The shaft 18 includes an axial hole 183 (FIG. 9) and a plurality of radial holes 184 extending radially from the axial hole 183 and opened on an outer circumferential surface of the shaft 18, and each of the plurality of cylinders 21 is connected to at least one of the plurality of radial holes 184. The total area of cross-sections of the plurality of radial holes 184 is less than the cross-section of the axial hole 183 so that the airflow in each of the plurality of radial holes 184 is of high pressure and low flow velocity and so that the airflow ejects in high flow velocity from the radial holes 184, which effectively cools the piston and the cylinder. The axial hole 183 is configured to be connected to an air supply device such as a blower, for forcing the air to enter the cylinder 21, and thus the heat dissipation efficiency is high. Preferably, the shaft 18 is provided with a large size, which is beneficial to the stability of the engine, helps the heat transfer and cooling of the engine, is conducive to the large power output, and is beneficial to form the axial hole 183 (big air hole) and the plurality of radial holes 184 (small air hole) blowing the air to the piston 50. An air supply device 19 is provided at an end of the shaft 18, and the air supply device forces the cooling fluid to the plurality of radial holes 184 through the axial hole 183, to achieve better heat dissipation efficiency. The present invention is very suitable for the design and manufacture of a multi-cylinder engine which needs the most a large shaft to stabilize the engine and transmit power, and the rotary engine 1 just fits requirement of the large shaft. Specifically, the shaft 18 further includes a plurality of ribs 185 extending axially on the outer circumferential surface, neighboring two of the plurality of ribs 185, the stator assembly 10 and the rotor 20 define a groove 186, and each of the plurality of radial holes 184 is opened on one of the plurality of ribs 185. The groove 186 is connected to an outside of the rotary engine 1, which is beneficial for heat dissipation.

Preferably, two steel sheets 113 are interposed between the intake stator 11 and the rotor 20 and between the exhaust stator 12 and the rotor 20, respectively. The two steel sheets 113 are radially protruding beyond the first bearing 112 and the second bearing 122, respectively. The two steel sheets 113 are configured to keep the gaps and to block the oil from flowing to the shaft 18. Centrifugal force prevents the oil in the cylinder 21 from flowing to the shaft 18. Only when the engine stops, the oil is able to flow to the shaft 18; however, as the engine starts again, the oil will be thrown outward. The two steel sheets 113 each can act as a barrier to prevent oil from easily entering the groove 186 of the shaft 18 and flowing out from the groove 186. In addition, with the spacer function of the two steel sheets 113, it avoids large-area friction between the rotor 20 and the intake stator 11 and between the rotor 20 and the exhaust stator 12, and avoids loss of kinetic energy.

Preferably, the stator assembly 10 further includes at least one cooling pipe 114 configured for receiving cooling medium, and the at least one cooling pipe 114 may be integrally formed as a part of at least one of the intake stator 11 and the exhaust stator 12. Preferably, the cooling pipe 114 is provided on the exhaust stator 12 and can be connected to the pipe receiving cooling medium, which can achieve an excellent heat dissipation effect.

In this embodiment, each of the plurality of cylinders 21 extends along a diametric direction of the rotor 20, which favors rotational balance, each of the plurality of cylinders 21 includes two guiding slots 213 which are disposed therethrough and diametrically correspond to each other and are configured to guide the piston rod 51. Two ends of each of the plurality of piston rods 51 are each sleeved with a bearing 511 received within the track 15, wherein the bearing 511 reduces friction considerably and allows the piston 50 to operate smoothly and efficiently.

An upper portion of each of the plurality of pistons 50 includes at least two ring receiving grooves 52 and at least one oil reservoiring groove 53 lower than the at least two ring receiving grooves 52, and at least two piston rings 54 are engaged within the at least two ring receiving grooves 52, respectively. The at least two piston rings 54 establish a good sealing between the piston 50 and the cylinder 21. Preferably, a (inner or outer) lower portion of each of the plurality of pistons 50 includes a plurality of piston heat dissipation fins 55, enhancing heat dissipation. The stator assembly 10 further includes a cylinder oiling hole 115 and a drain hole 116 (lower than the cylinder oiling hole, about six o'clock position in FIG. 14) connected to the track 15. The oil is poured into the at least one oil reservoiring groove 53 via the cylinder oiling hole 115, and thus there is sufficient quantity of oil for lubricating the piston 50 in the next high-load stroke (compression stroke and explosion stroke). When the rotor 20 rotates and the cylinder oiling hole 115 and the oil reservoiring groove 53 of the piston 50 correspond to and are connected to each other, the oil contacts the piston 50, and the oil can enter the cylinder 21 because of the action of centrifugal force; when the oil entering the piston 50 is scraped back by the two piston rings 54, some oil can enter the gap between the rotor 20 and the intake stator 11 and the gap between the rotor 20 and the exhaust stator 12 via the guiding slots 213 of the cylinder, and the oil moves between an inner seal of the rotor 20 and the drain hole 116 because of the action of centrifugal force, and the oil can be drained from the drain hole 116, wherein the drain hole 116 is preferably located in a lower position, for example, almost next to the inner edge of the annular intake groove 111. The oil entering the at least one oil reservoiring groove 53 moves with the piston 50 and lubricates the cylinder 21. Repeatedly, the oil can lubricate the cylinder 21 and dissipate the heat from the piston 50 and the cylinder 21 to the outside of the system. In addition, a plurality of stator heat dissipation fins 118 may be provided on an axially-facing outer surface of the intake stator 11 to increase heat dissipation. The stator assembly 10 further includes a track oiling hole 117 (in this embodiment, about six o'clock position in FIG. 12) connected to the track 15. A small amount of oil brought by the plurality of cylinders 21 enters the track 15 at a point about six o'clock position. Since the oil in the cylinder oiling hole 115 applied at the point about nine o'clock position 9 might not enter the track 15, it needs to pour some oil into the track 15.

In this embodiment (FIGS. 3 and 6-11), each of the plurality of valve mechanisms 30 further includes a valve stem assembly 34 which is resiliently posited on the cylinder head 22 and includes a roller 35 abutted against the stator assembly 10. When the roller 35 moves with the rotor 20 and is urged by a raise posited on an outer circumferential surface of the stator assembly 10, the valve mechanism 30 is driven to open. Preferably, the roller 35 is partially received within an annular guiding groove posited on an inner circumferential surface of the stator assembly 10, which provides precise and stable guidance to the roller 35. The roller 35 is preferably a wheel made of high-strength rubber, which prevents and buffers the roller 35 from impacting hard against an intake raise 171 on the intake stator 11 or against an exhaust raise 172 on the exhaust stator 12 when the roller 35 is running at high speed.

Please refer to FIG. 4, it shows the operation of rotary engine of the present invention. Combustion gas (mixture of air and fuel) is supplied, from the outside of the rotary engine 1, into the annular intake groove 111; the intake stroke (from I to C) is about 150 degrees; a first cylinder I1, a second cylinder 12 and a third cylinder 13 are within the intake stroke; there is none of exhaust raise 172 provided on an exhaust inner surface 102 of the exhaust stator 12, and the exhaust valve 32 is therefore in a closed state; when the intake valve 31 can be urged to open by the intake raise 171 posited on an intake inner surface 103 of the intake stator 11, and at the same time, the piston 50 moves along the track 15 from a top dead center to a bottom dead center so that the cylinder 21 carries out a 150-degree intake stroke (the intake raise 171 extends for 150 degrees) for entering sufficient combustion gas; when the intake stroke ends, the intake raise 171 on the intake inner surface 103 of the intake stator 11 does not correspond to the intake valve 31, the intake valve 31 is closed, and at the same time, the piston 50 moves along the track 15 from the bottom dead center to the top dead center to carry out the compression stroke (from C to B) for 60 degrees, wherein a fourth cylinder C1 in FIG. 4 is carrying out the compression stroke; when the compression stroke ends (B), then the spark plug 60 ignites to induce explosion to generate power, the power stroke (B to E) is carried out for about 90 degrees, wherein a fifth cylinder B1 and a sixth cylinder B2 in FIG. 4 are carrying out the power stroke, the piston 50 in the cylinder 21 moves along the inclined section 151 toward the bottom dead center, and since the piston 50 moves along the inclined section 151 of the track 15, it does not result in loss of the power generated so that the engine can generate a huge torque; when the power stroke ends (E), then the exhaust stroke (from E to I) is carried out for about 60 degrees (the exhaust raise 172 also extends for about 60 degrees), wherein a seventh cylinder E1 in FIG. 4 is carrying out the exhaust stroke, and at the same time, the exhaust raise 172 on the exhaust inner surface 102 of the exhaust stator 12 corresponds to the exhaust valve 32, the exhaust valve 32 is opened, the piston 50 moves along the track 15 toward the top dead center, exhaust gas in the cylinder 21 is discharged via the exhaust port 222 (FIG. 11); a eighth cylinder E2 in FIG. 4 is carrying out the last part of the exhaust stroke. The above are the basic intake, compression, power and exhaust strokes of an engine, wherein through the cooperation of the opening and closing of the plurality of valve mechanisms 30 at the appropriate timing, the individual actuation timings of all strokes can be controlled separately and precisely.

Figure 15:
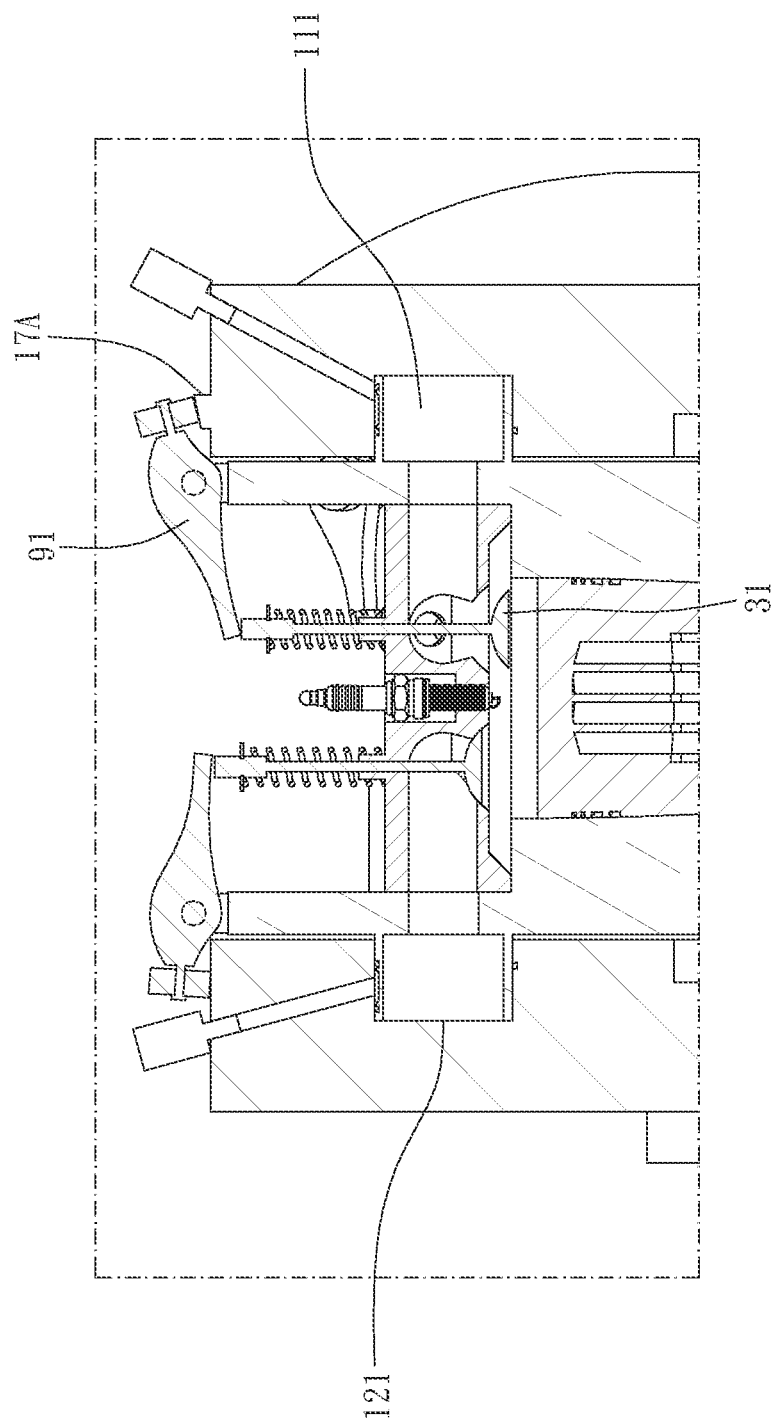
FIG. 15 is a partial cross-sectional view of the another preferable embodiment of the present invention.

In another embodiment (FIG. 15), the two stators each include a raise 17A on the outer circumference thereof, for controlling the drag lever 91. When an end of the drag lever 91 is lifted by the raise 17A, the spring will be compressed, thereby controlling the opening and closing of the valve mechanism.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A rotary engine, including:
a stator assembly, including an intake stator and an exhaust stator, the intake stator and the exhaust stator each including an annular guiding groove, the annular guiding groove of the intake stator and the annular guiding groove of the exhaust stator axially corresponding to each other and defining a track, the intake stator further including an annular intake groove, the exhaust stator further including an annular exhaust groove;

a rotor, rotatably disposed between the intake stator and the exhaust stator, including a plurality of cylinders and a plurality of cylinder heads, each of the plurality of cylinders being covered by one of the plurality of cylinder heads, each of the plurality of cylinder heads including an intake port and an exhaust port, the intake port being connected to the annular intake groove, the exhaust port being connected to the annular exhaust groove;

a shaft, inserted axially in the stator assembly and the rotor;

a plurality of valve mechanisms, posited on the plurality of cylinder heads respectively and each including an intake valve configured to selectively close the intake port and an exhaust valve configured to selectively close the exhaust port;

a plurality of pistons, received in the plurality of cylinders respectively and each including a piston rod which projects radially beyond one of the plurality of cylinders and is movable along the track, an intake starting point, a compression starting point, a power starting point and an exhaust starting point of each of the plurality of pistons being sequentially defined relatively based on the track; and a plurality of spark plugs, posited on the plurality of cylinder heads and exposed to interiors of the plurality of cylinders, respectively.

2. The rotary engine of claim 1, wherein each of the plurality of cylinders extends along a diametric direction of the rotor.

3. The rotary engine of claim 1, wherein two ends of each of the plurality of piston rods are each sleeved with a bearing received within the track.

4. The rotary engine of claim 1, wherein each of the plurality of cylinders includes two guiding slots which are disposed therethrough and diametrically correspond to each other and are configured to guide the piston rod.

5. The rotary engine of claim 4, wherein an upper portion of each of the plurality of pistons includes at least two ring receiving grooves and at least one oil reservoiring groove lower than the at least two ring receiving grooves, at least two piston rings are engaged within the at least two ring receiving grooves respectively, the stator assembly further includes a cylinder oiling hole, and the cylinder oiling hole is connected to one of the two guiding slots and corresponds to the at least one oil reservoiring groove.

6. The rotary engine of claim 1, wherein a lower portion of each of the plurality of pistons includes a plurality of piston heat dissipation fins.

7. The rotary engine of claim 4, wherein the stator assembly further includes a track oiling hole connected to the track.

8. The rotary engine of claim 1, wherein the stator assembly further includes a drain hole connected to the track.

9. The rotary engine of claim 1, wherein the rotor further includes two annular chambers, each of the two annular chambers is defined by an inner annular wall and an outer annular wall inserted in the annular intake groove and the annular exhaust groove, respectively, the outer annular wall includes an annular reservoir on an outer side thereof, and two seals are engaged within the outer annular wall at two sides of the annular reservoir and abutted against an inner surface of the annular guiding groove.

10. The rotary engine of claim 9, wherein the stator assembly further includes a plurality of oiling holes connected to at least one oil pot, and each of the plurality of oiling holes is connected to the annular reservoir.

11. The rotary engine of claim 1, wherein the shaft includes an axial hole extending axially and a plurality of radial holes extending radially from the axial hole and opened on an outer circumferential surface of the shaft, and each of the plurality of cylinders is connected to at least one of the plurality of radial holes.

12. The rotary engine of claim 11, wherein the shaft further includes a plurality of ribs extending axially on the outer circumferential surface, neighboring two of the plurality of ribs, the stator assembly and the rotor define a groove, and each of the plurality of radial holes is opened one of the plurality of ribs.

13. The rotary engine of claim 12, wherein a first bearing is sleeved with and between the intake stator and the shaft, and a second bearing is sleeved with and between the exhaust stator and the shaft; two steel sheets are interposed between the intake stator and the rotor and between the exhaust stator and the rotor, respectively, and the two steel sheets are radially protrusive beyond the first bearing and the second bearing, respectively.

14. The rotary engine of claim 1, wherein the stator assembly further includes at least one cooling pipe configured for receiving cooling medium.

15. The rotary engine of claim 1, wherein each of the plurality of valve mechanisms further includes a valve stem assembly which is resiliently posited on the cylinder head and includes a roller abutted against the stator assembly, and when the roller moves with the rotor and is urged by a raise of the stator assembly, the valve mechanism is driven to open.

16. The rotary engine of claim 1, wherein each of the plurality of valve mechanisms further includes a valve stem assembly which is resiliently posited on the cylinder head and a drag lever which is pivotally connected to the rotor, the drag lever includes a roller abutted against an outer circumferential surface of the stator assembly, and when the roller moves with the rotor and is urged by a raise on the outer circumferential surface of the stator assembly, the drag lever drives the valve stem assembly to open.

* * * * *